No. 671,826. Patented Apr. 9, 1901.
K. G. JOHNSTON.
CHANGE GEARING.
(Application filed June 28, 1900.)
(No Model.)
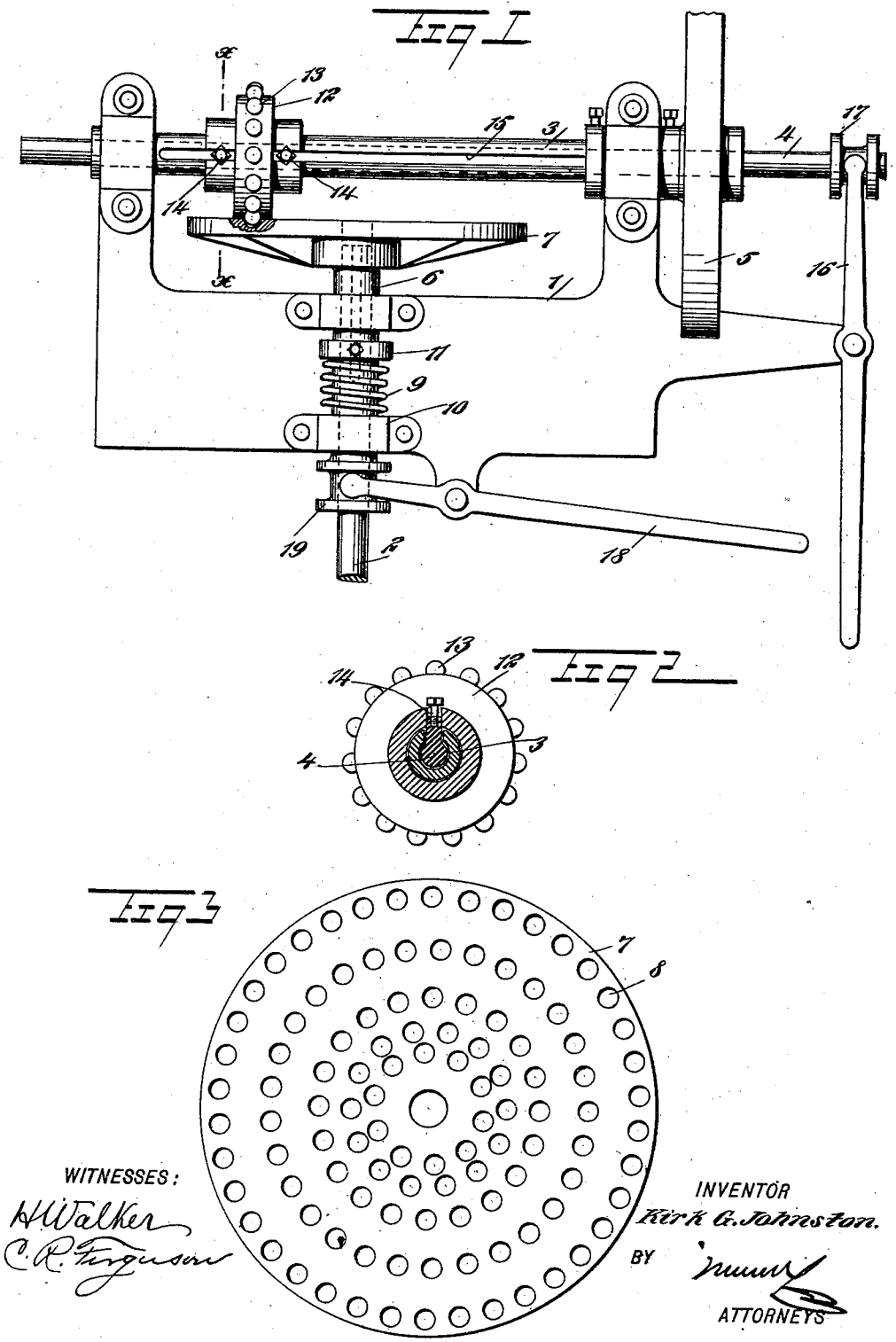
INVENTOR
Kirk G. Johnston.

UNITED STATES PATENT OFFICE.

KIRK G. JOHNSTON, OF PIQUA, OHIO.

CHANGE-GEARING.

SPECIFICATION forming part of Letters Patent No. 671,826, dated April 9, 1901.

Application filed June 28, 1900. Serial No. 21,875. (No model.)

*To all whom it may concern:*

Be it known that I, KIRK G. JOHNSTON, a citizen of the United States, and a resident of Piqua, in the county of Miami and State of Ohio, have invented a new and Improved Change-Gearing, of which the following is a full, clear, and exact description.

This invention relates to improvements in change-gearing particularly adapted for automobiles or the like; and the object is to provide a change-gearing of simple construction and comprising but two gear-wheels so arranged that adjustment for different speeds may be quickly made.

I will describe a change-gearing embodying my invention and then point out the novel features in the appended claim.

Reference is to be had to the accompanying drawings, forming a part of this specification, in which similar characters of reference indicate corresponding parts in all the figures.

Figure 1 is a plan view of a change-gearing embodying my invention. Fig. 2 is a section on the line x x of Fig. 1, and Fig. 3 is a face view of one of the gear-wheels employed.

Referring to the drawings, 1 designates a frame of suitable construction, and mounted to rotate in bearings on this frame are shafts 2 and 3, the shaft 3 being tubular to receive a shifting rod 4, which is movable longitudinally in said shaft, and also on this shaft 3 is secured a driving-wheel 5. It is to be understood, however, that the power may be applied to the shaft 2 instead of to the shaft 3 without departing from the spirit of my invention. A sleeve 6 is mounted to slide on the shaft 2, but is designed to rotate therewith, and therefore one part is provided with a feather or the like to engage in a channel in the other part. Rigidly mounted on this sleeve 6 is a gear-wheel 7, provided with a series of rows of recesses or openings 8, the said rows being arranged in concentric circles, as plainly shown in Fig. 3. The gear-wheel 7 is held in its outer or engaging position with a pinion, to be hereinafter described, by means of a spring 9, surrounding the sleeve 6 and engaging at one end with a bearing 10 and at the other end with a collar 11 on said sleeve.

Mounted to move longitudinally on the shaft 3, but designed to rotate therewith, is a pinion 12, the teeth 13 of which are adapted to enter the recesses or openings 8 of the wheel 7. These teeth 13, as plainly indicated, are of globe-like construction. The pinion 12 is attached by means of bolts 14 to the shifting rod 4, these bolts passing through a slot 15, formed longitudinally in the shaft 3. Therefore by operating a lever 16, engaging with a channeled collar 17 on the rod 4, the said pinion will be moved longitudinally of the shaft to cause it to engage with either one of the circular rows of recesses or openings 8 in the wheel 7, and it is obvious that as the bolts 14 engage with the walls of the slot 15 the said pinion will be caused to rotate with the shaft 3. A lever 18, engaging with a channeled collar 19 on the sleeve 6, is designed to move said sleeve longitudinally of the shaft 2 to disengage the wheel 7 from the pinion.

In operation when a fast motion of the shaft 3 is desired the pinion 12 is to be shifted, so that its teeth will engage with the outer row of the recesses 8. Then when power is applied to the shaft 2 to rotate the gear-wheel 7 the said pinion with the shaft 3 will be rotated at such high rate of speed. When it is desired to decrease the speed, by operating the lever 18 the gear-wheel 7 is to be moved out of engagement with the pinion. Then the pinion is moved by operating the lever 16, so that its teeth will engage with either one of the circular rows of recesses 8 desired.

It will be noted that this change-gearing is of very simple construction, with very little likelihood of getting out of order or of breaking. While I have mentioned it as particularly adapted for automobiles or similar devices, it is obvious that it may be used in different classes of fixed machinery.

Having thus described my invention, I claim as new and desire to secure by Letters Patent—

A change-gearing, comprising a gear-wheel having a series of concentric rows of recesses, a sleeve to which said gear-wheel is connected, a shaft on which said sleeve is mounted to slide but adapted to rotate therewith, means for moving the sleeve longitudinally, a pinion having teeth for engaging in the recesses of any one of the circular rows, a tubular shaft on which the pinion is mounted, a shifting rod movable in said shaft, and connections between the said rod and the pinion, the said connections extending through a slot in the shaft, substantially as specified.

In testimony whereof I have signed my name to this specification in the presence of two subscribing witnesses.

KIRK G. JOHNSTON.

Witnesses:
   JNO. M. RITTER,
   C. R. FERGUSON.